S. E. HENRIE.
VEHICLE WHEEL TIRE.
APPLICATION FILED MAY 10, 1920.
1,365,171.
Patented Jan. 11, 1921.
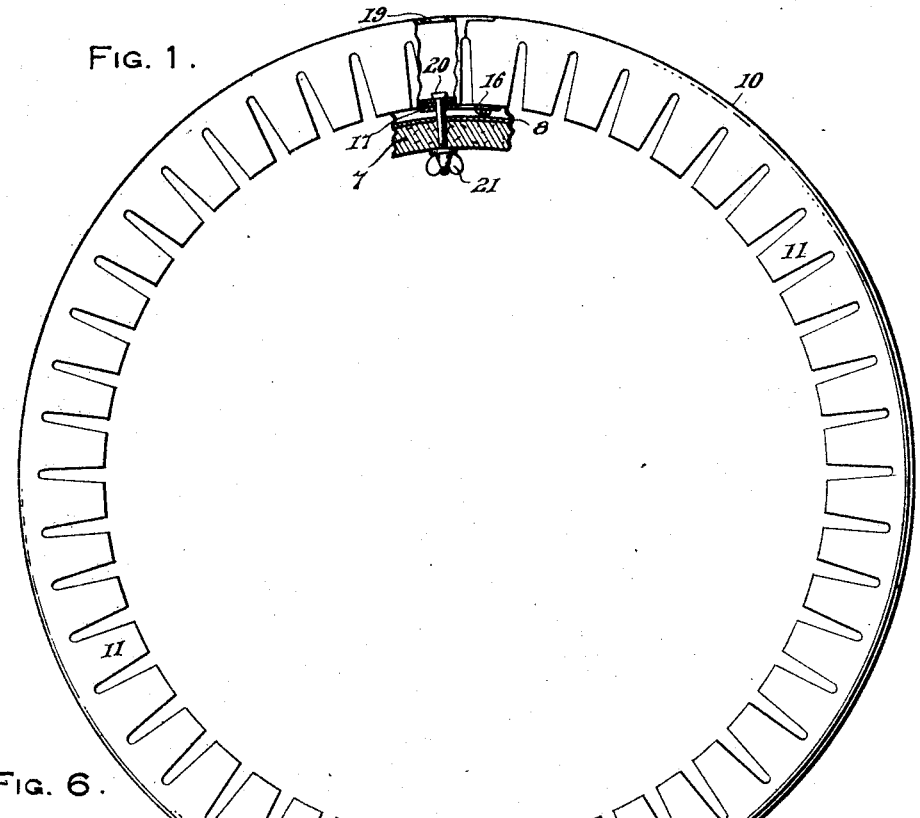
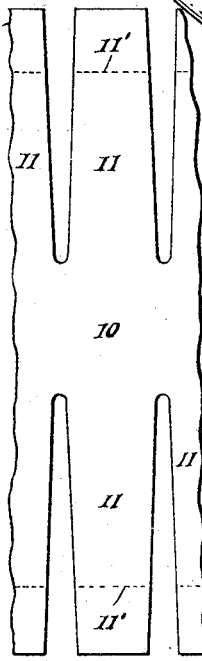
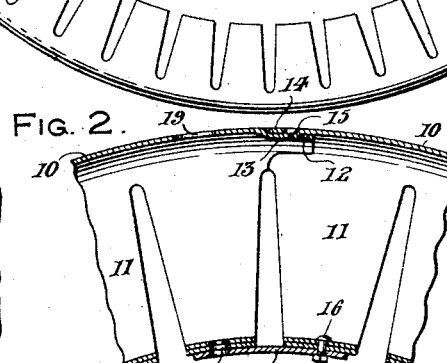
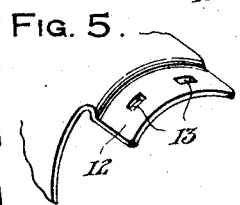
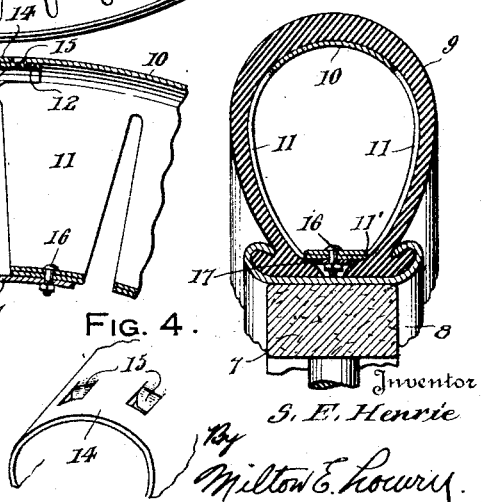

UNITED STATES PATENT OFFICE.

SAMUEL E. HENRIE, OF PROVO, UTAH.

VEHICLE-WHEEL TIRE.

1,365,171. Specification of Letters Patent. Patented Jan. 11, 1921.

Application filed May 10, 1920. Serial No. 380,267.

*To all whom it may concern:*

Be it known that I, SAMUEL E. HENRIE, a citizen of the United States of America, residing at Provo, in the county of Utah and State of Utah, have invented certain new and useful Improvements in Vehicle-Wheel Tires, of which the following is a specification.

The primary object of the present invention resides in the provision of a vehicle wheel tire wherein a metallic spring device is to be employed in lieu of the ordinary inflatable inner tube and is adapted to be positioned within a tire shoe or casing for purposes of holding the shoe extended and for properly supporting a load upon the wheel.

With the above and other objects in view, the invention consists in the novel form, combination and arrangement of parts herein fully described, shown in the accompanying drawings and claimed.

In the drawings forming a part of this application and wherein like reference characters indicate similar parts throughout the several views, Figure 1 is a side elevational view, partially shown in section of the metallic insert for tire shoes, Fig. 2 is a fragmentary sectional view of the metallic spring showing the manner of connecting the adjacent ends, Fig. 3 is a cross sectional view showing the metallic spring within a tire shoe, Figs. 4 and 5 are perspective views of the adjacent connecting ends of the metallic spring, and Fig. 6 is a fragmentary developed plan view of a portion of the metallic spring.

Briefly described, the present invention aims to provide a metallic spring device adapted for insertion within the ordinary tire shoe or casing of a motor vehicle wheel to be used in lieu of the usual inflatable inner tube, the employment of a metallic spring of this character affording the usual amount of resiliency to the wheel for supporting the load and also obviates the liability of the collapsing of the tire shoe. One of the important features of the present invention resides in the specific manner of connecting the adjacent free ends of the metallic spring member and also the device for anchoring the metallic spring upon a wheel felly.

Referring more in detail to the accompanying drawing and particularly to Figs. 1 and 3, there is provided an ordinary construction of automobile wheel felly 7 having suitably secured thereon a metallic rim 8 supporting the ordinary form of clencher tire shoe 9. The present invention embodying a metallic spring adapted for insertion within the shoe 9 in lieu of the usual pneumatic tube is formed of resilient sheet metal as illustrated in developed plan view of Fig. 6 as having an uninterrupted central longitudinal section 10 having a plurality of adjacent oppositely positioned arms 11 that are adapted to be bent substantially to an oval form as shown in Fig. 3 when inserted within the tire 9. The strip 10 with the opposite converging arms 11 is adapted to be bent into the circular form illustrated in Fig. 1 with the adjacent ends of the strip secured together to retain the circular formation. The oppositely disposed arms 11 are bent toward each other in overlapping relations to the extent of the dotted line 11' as shown in Fig. 6 with the overlapped portions suitably secured in any preferred manner.

The connecting means between the adjacent ends of the central strip 10 includes a tongue extension 12 offset inwardly from the strip 10 as shown in Fig. 5 and provided with a pair of spaced openings 13. The opposite end 14 of the strip 10 overlies the tongue extension 12 and is provided with struck out portions 15 constituting inwardly directed spring fingers for reception in the tongue openings 13 to retain the strip ends in assembled connected arrangement.

The overlapped ends of the arms 11 at one end of the strip 10 are secured as by a bolt 16, to one end of a plate 17 that extends to underlie the overlapped ends of the arms at the opposite end of the strip 10 with alined openings 18 in said ends and strip 17, which openings register with the opening in the wheel felly 7 through which the inflatable tube of a pneumatic tire is ordinarily passed. As shown in Figs. 1 and 2, the strip 10 adjacent the tongue extension 12 is provided with an opening 19 to facilitate the insertion of the bolt 20 in the openings 18, the bolt being inserted in the openings prior to the mounting of the tire on the rim. With the bolt 20 so positioned, the pneumatic shoe 9 is placed thereon in an obvious manner, and the tire and insert are then mounted on the rim 8 with the bolt 20 passing through the usual inflating valve clearance opening. With the rim previously placed on the felly the bolt 20 is passed through the opening in the rim and felly ordinarily occupied by the tire inflating valve, this bolt serving the function of preventing creeping movement of the metallic insert on the felly. The inner end of the bolt 20 is threaded and receives a thumb nut 21 to bind the same to the wheel felly.

From this description, it will therefore be seen that a novel form of metallic spring device is readily capable of substitution for the usual tire of pneumatic inner tube while the novel manner of connecting the ends of said spring device as well as the devices for anchoring the same upon a wheel rim offer improvements to the art to which the invention pertains, and while there is herein shown and described the preferred embodiment of the invention, it is nevertheless to be understood that minor changes may be made in the novel form, combination and arrangement of parts without departing from the spirit and scope of the invention as hereinafter claimed.

What is claimed as new is:

1. A metallic spring insert for tire shoes formed of a substantially tubular body of metal bent to circular formation, a tongue carried by one end of the outer peripheral side of the body and offset inwardly thereof, the said tongue having a pair of openings therein, spring fingers struck inwardly from the other end of the outer peripheral side of said body with the fingers received in the tongue openings and spaced from the edges of the tongue when the ends are in overlapped relations, connecting means between the ends of the inner peripheral side of said tubular body and means for anchoring the tubular body upon a wheel rim.

2. A metallic spring insert for tire shoes formed of a substantially tubular body of metal bent to circular formation, connecting means between the meeting edges of the outer peripheral side of the tubular body, a plate connected to one end of the inner peripheral side of the tubular body and overlying the other end of the inner peripheral side of said body, and a bolt passing through the last named end of the body and plate to connect the same and anchor the insert to a wheel felly.

In testimony whereof I affix my signature.

SAMUEL E. HENRIE.